United States Patent
Huang

(10) Patent No.: US 6,354,195 B1
(45) Date of Patent: Mar. 12, 2002

(54) ROTATING AXLE SKEWER SLEEVE OF A ROTISSERIE OVEN

(76) Inventor: Sheng-I Huang, No. 35, Cheng-I 12 Street, Jen-Te Hsiang, Tainan Hsien (TW)

( * ) Notice: Subject to any disclaimer, the term of this patent is extended or adjusted under 35 U.S.C. 154(b) by 0 days.

(21) Appl. No.: 09/900,897

(22) Filed: Jul. 10, 2001

(51) Int. Cl.⁷ .................... A47J 37/00; A47J 37/04; A47J 37/07
(52) U.S. Cl. ................ 99/421 H; 99/419; 99/421 HH; 99/427
(58) Field of Search .................. 99/331, 339, 340, 99/341, 352–355, 400, 401, 419–421 V, 427, 444–450, 481, 482; 126/25 R, 9 R, 41 R, 299 C; 219/400, 401; 426/523, 466

(56) References Cited

U.S. PATENT DOCUMENTS

| | | | | |
|---|---|---|---|---|
| 3,113,504 A | * | 12/1963 | Reed | 99/421 H |
| 3,247,827 A | * | 4/1966 | Cremer | 99/421 H |
| 4,112,832 A | * | 9/1978 | Severdia et al. | 99/421 HH |
| 4,810,856 A | * | 3/1989 | Jovanovic | 126/25 R |
| 4,924,766 A | * | 5/1990 | Hitch | 99/421 HV |
| 5,007,403 A | * | 4/1991 | Chen | 219/401 |
| 5,195,425 A | * | 3/1993 | Koziol | 99/447 X |
| 5,333,540 A | * | 8/1994 | Mazzocchi | 99/450 X |
| 5,421,318 A | * | 6/1995 | Unruh et al. | 126/9 R |
| 5,536,518 A | * | 7/1996 | Rummel | 426/523 |
| 5,649,475 A | * | 7/1997 | Murphy et al. | 99/421 H |
| 5,819,639 A | * | 10/1998 | Spell | 99/446 X |
| 6,076,453 A | * | 6/2000 | Hsu | 99/419 X |

* cited by examiner

Primary Examiner—Timothy F. Simone
(74) Attorney, Agent, or Firm—Rosenberg, Klein & Lee

(57) ABSTRACT

A rotating axle skewer sleeve in the present invention is provided in a rotisserie oven with the rear end receiving the protruding rod of the motor on one inner side wall of the rotisserie oven. The rotating axle skewer sleeve is provided with a right quadrangle hollow in the center for the spear end of the rotating axle skewer to be promptly and smoothly plugged into in any azimuth angle.

1 Claim, 6 Drawing Sheets

ROTATING AXLE SKEWER SLEEVE OF A ROTISSERIE OVEN

BACKGROUND OF THE INVENTION

1. Field of the Invention

The present invention relates to a rotating axle skewer sleeve of a rotisserie oven, and more particularly to a sleeve which is provided with a regular octagonal hollow conveniently for the spear end of the rotating axle skewer to be promptly and smoothly plugged into in any azimuth angle.

2. Description of the Related Art

Generally, there are two types of rotisserie ovens, one is small type for toasting, roasting sausage, squid, etc., and the other one is large type for roasting whole chicken, duck, fish, meat, etc.

A conventional large rotisserie oven 10, referring to FIGS. 1,2,3 and 4, is provided with an against member 101 on one inner side wall and is provided with an axle skewer sleeve 102 on the other inner side wall. The rotating axle skewer sleeve 102 is provided with a right quadrangle hollow 103, and the rear end of the rotating axle skewer sleeve 102 receives the protruding rod 105 of the motor 104. A rotating axle skewer 20 is provided for sticking through the chicken, duck, fish or meat to be roasted in the rotisserie oven 10. The rotating axle skewer 20 is shaped as an elongated right tetrahedron so as to prevent from rotating idly. The spear end 201 of the rotating axle skewer 20 is formed as a right pyramid, and the other end of the rotating axle skewer 20 is defined as a mounting portion 202.

While being used, after the food to be roasted being stuck through by the rotating axle skewer 20, the spear end 201 of the rotating axle skewer 20 is plugged into the right quadrangle hollow 103 of the rotating axle skewer sleeve 102, and then the mounting portion 202 is placed on the against member 101. The rotating axle skewer 20 as well as the food will rotate with the rotation of the motor 104.

However, when a user would like to plug the spear end 201 of the rotating axle skewer 20 into the conventional right quadrangle hollow 103 of the rotating axle skewer sleeve 102, he/she must first adjust the spear end 201 to a certain azimuth angle so as to smoothly plug the spear end 201 into the right quadrangle hollow 103. It not only takes time but also causes trouble for a user to install the rotating axle skewer 20 in the rotisserie oven 10.

SUMMARY OF THE INVENTION

Accordingly, the present invention is to provide a rotating axle skewer sleeve of a rotisserie oven which can substantially obviates the drawback of the related conventional art.

An oject of the present invention is to provide a rotating axle skewer sleeve of a rotisserie oven which is provided with a regular octagonal hollow for the spear end of the rotating axle skewer to be promptly and smoothly plugged into in any azimuth angle so as to save time for installation.

To achieve the advantage, a rotating axle skewer sleeve in the present invention is provided in a rotisserie oven with the rear end receiving the protruding rod of the motor on one inner side-wall of the rotisserie oven. The rotating axle skewer sleeve is provided with a right quadrangle hollow in the center for the spear end of the rotating axle skewer to be promptly and smoothly plugged into in any azimuth angle.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
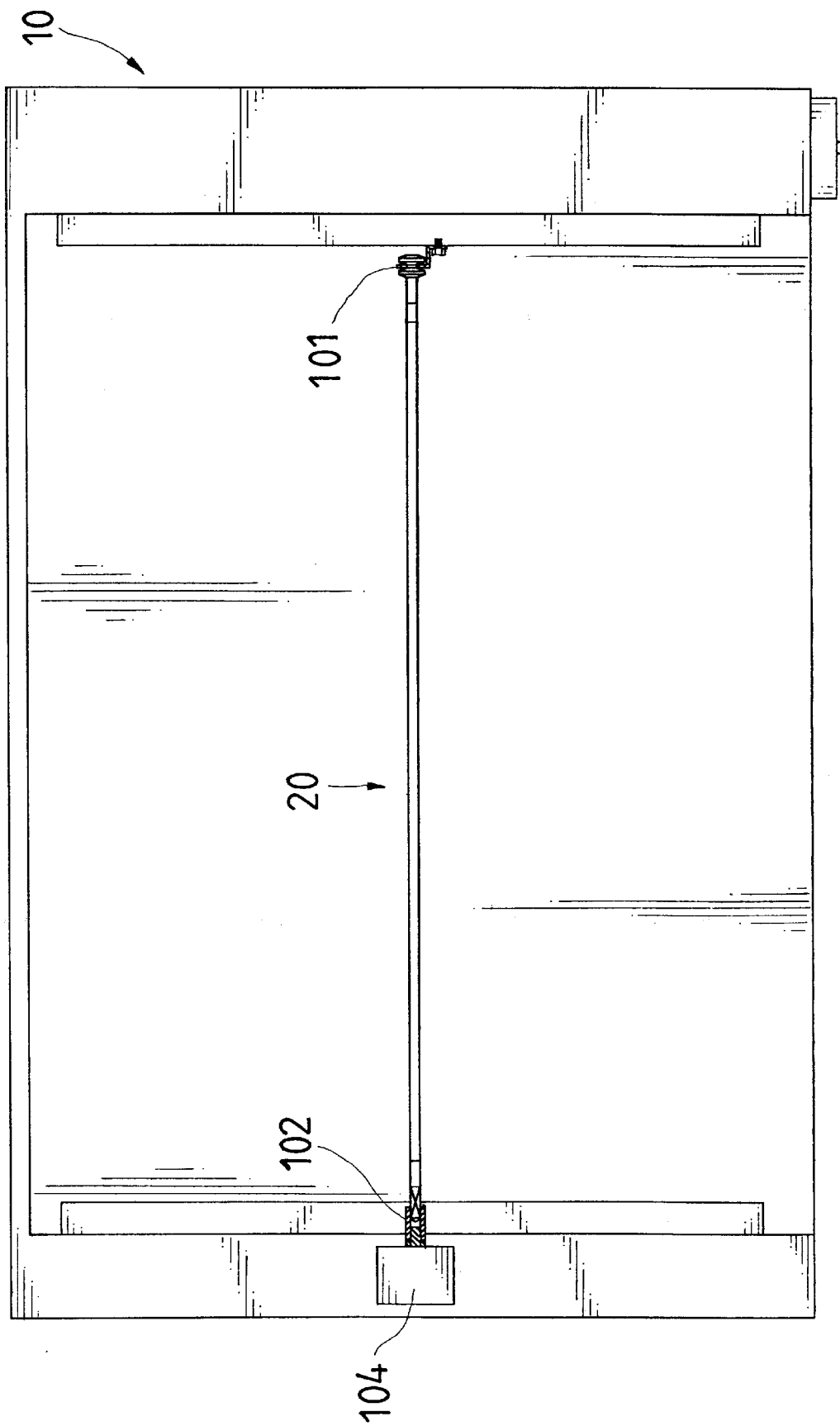
FIG. 1 is a sectional view of a rotisserie oven with a conventional rotating axle skewer sleeve.
Figure 6:
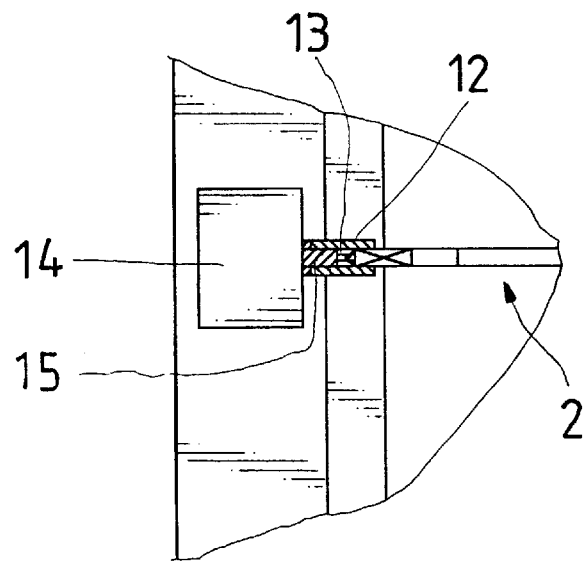
FIG. 6 is a schematic sectional view of a rotating axle skewer being plugged in the rotating axle skewer sleeve in accordance with the present invention.
Figure 2:
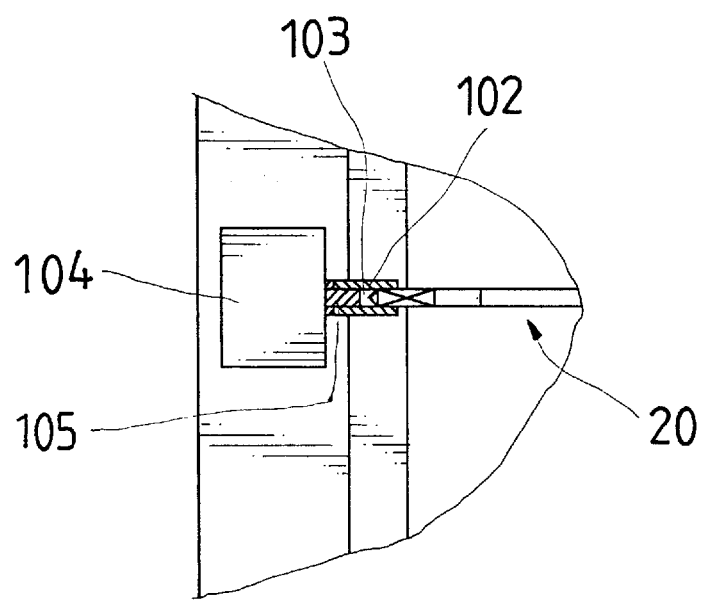
FIG. 2 is a schematic sectional view of a rotating axle skewer being plugged in a conventional rotating axle skewer sleeve.
Figure 3:
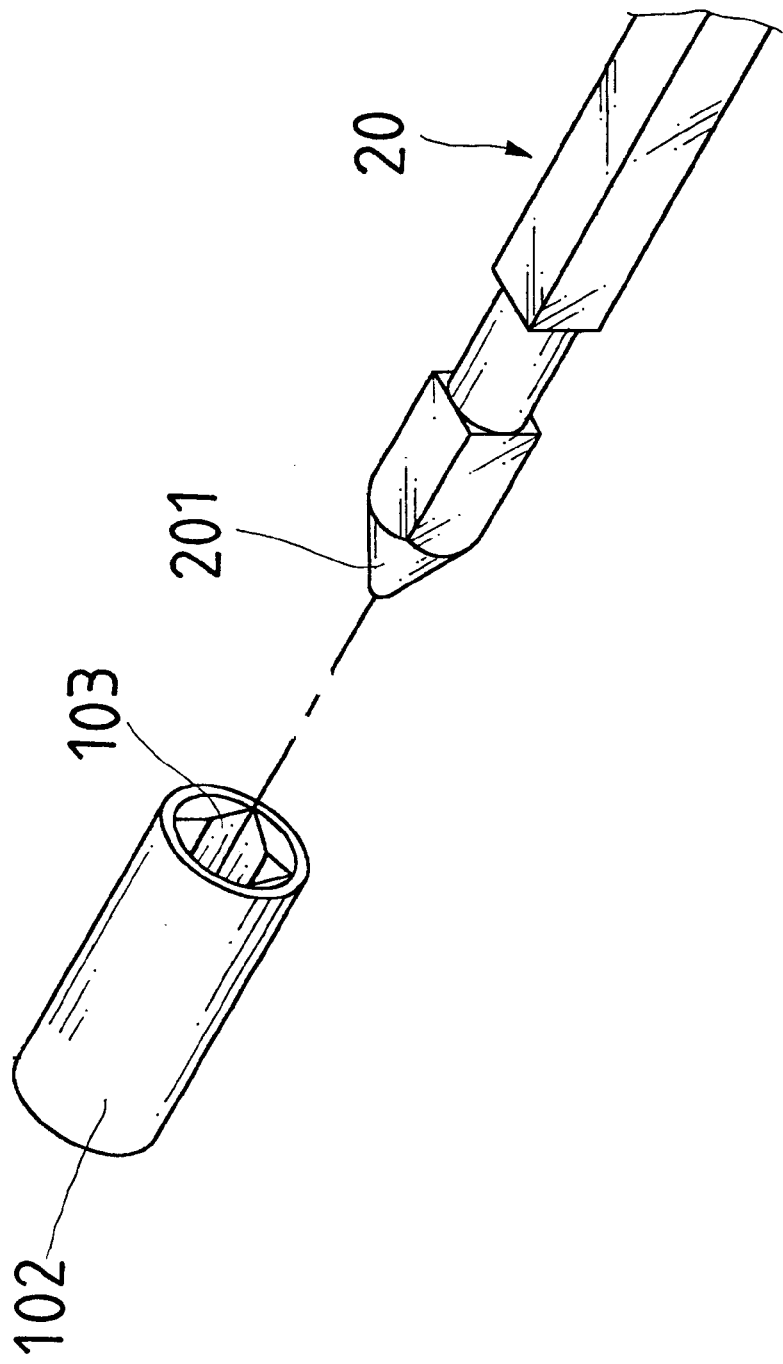
FIG. 3 is a perspective exploded view of a rotating axle skewer and a conventional rotating axle skewer sleeve.
Figure 4:
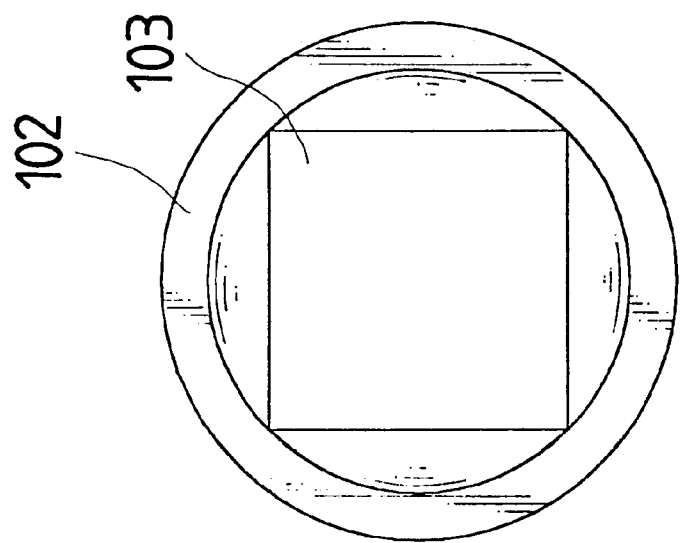
FIG. 4 is a front view of a conventional rotating axle skewer sleeve with a right quadrangle hollow.
Figure 8:
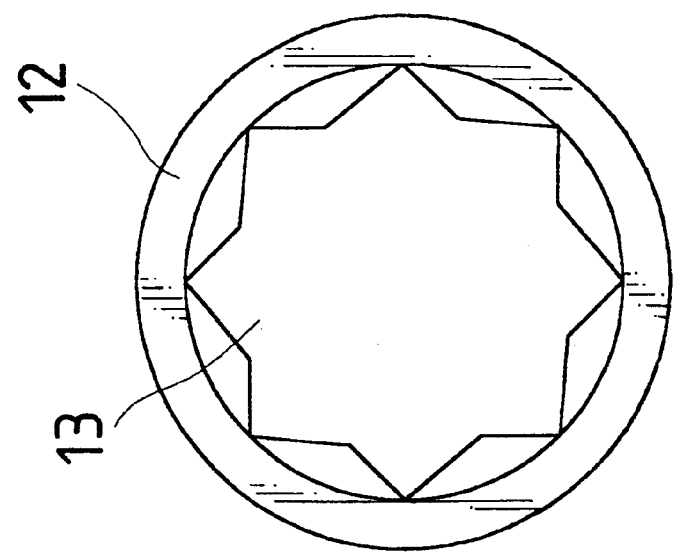
Figure 5:
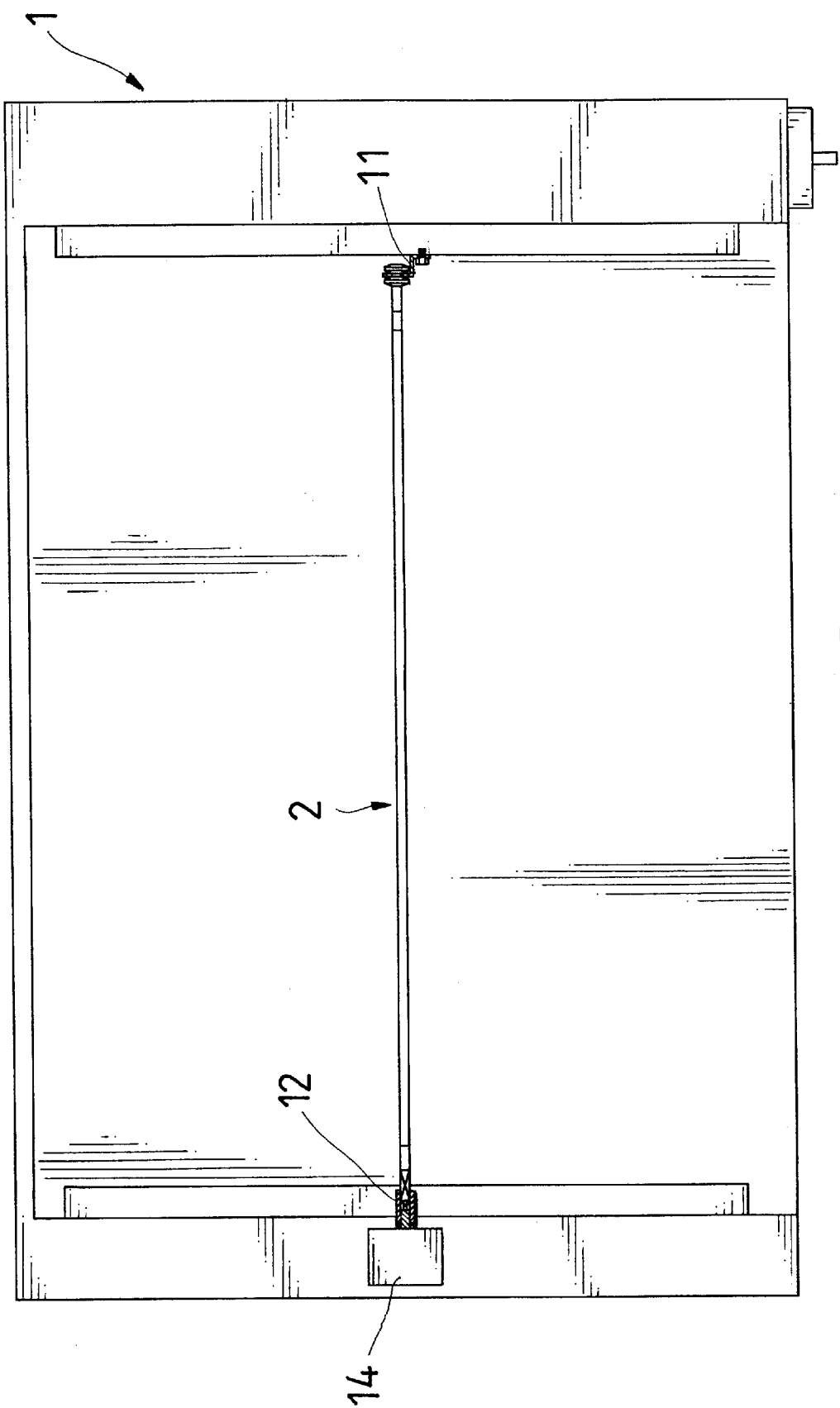
FIG. 5 is a sectional view of a rotisserie oven with an embodiment of the rotating axle skewer sleeve in accordance with the present invention.
Figure 7:
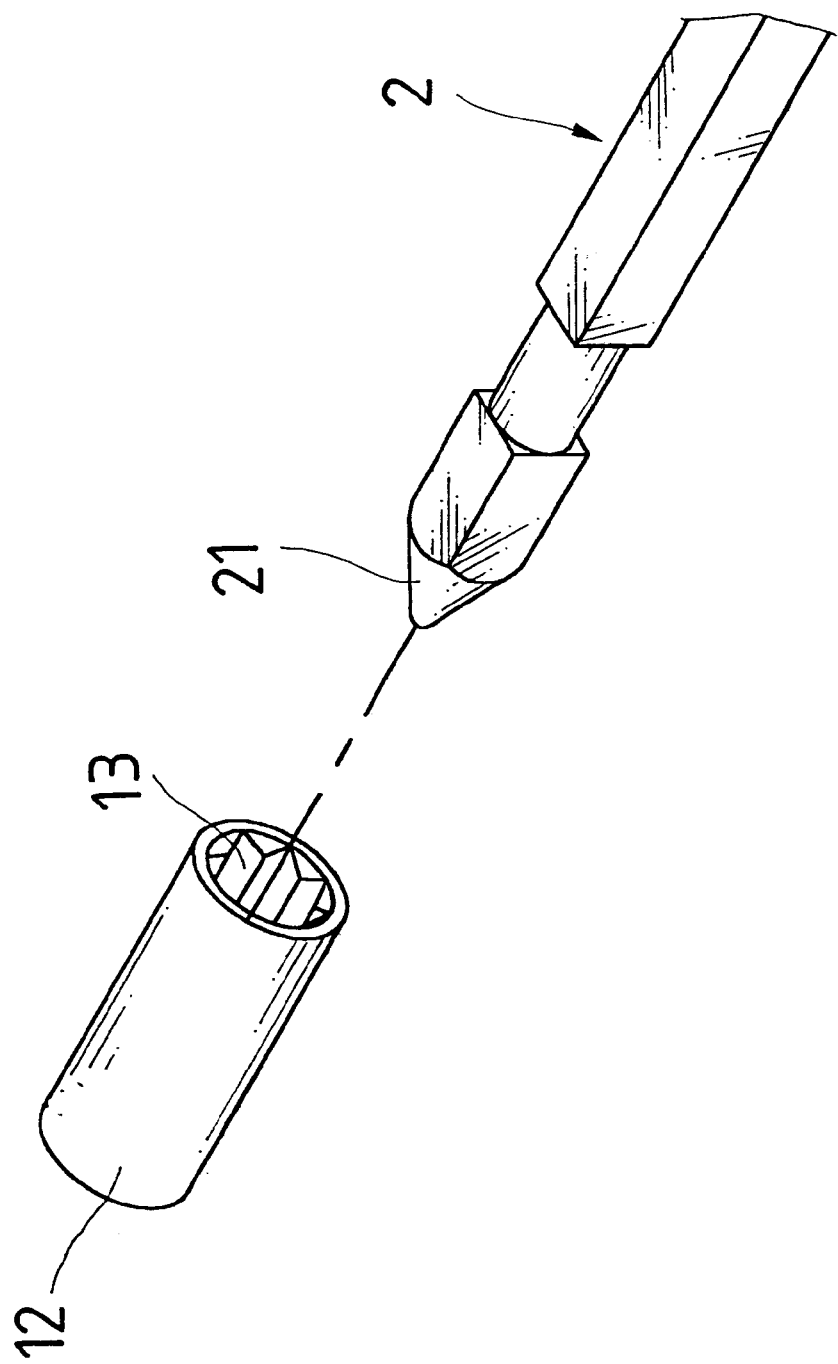
FIG. 7 is a perspective exploded view of a rotating axle skewer and the rotating axle skewer sleeve in accordance with the present invention; and, FIG. 8 is a front view of the rotating axle skewer sleeve with a regular octagonal hollow in accordance with the present invention.

Referring to FIGS. 5, 6, 7 and 8, a preferred embodiment of the present invention of the rotating axle skewer sleeve 12 of a large rotisserie oven 1 is provided on one inner side wall of the large rotisserie oven 1. An against member 11 is provided on the other inner side wall of the rotisserie oven 1. The rotating axle skewer sleeve 12 is provided with a regular octagonal hollow 13 in the center, and the rear end of the rotating axle skewer sleeve 12 receives the protruding rod 15 of the motor 14. A rotating axle skewer 2 is provided for sticking through the chicken, duck, fish or meat to be roasted in the rotisserie oven 1. The rotating axle skewer 2 is shaped as an elongated right tetrahedron so as to prevent from rotating idly. The spear end 21 of the rotating axle skewer 2 is formed as a right pyramid, and the other end of the rotating axle skewer 2 is defined as a mounting portion 22.

While being used, after the food to be roasted being stuck through by the rotating axle skewer 2, the spear end 21 of the rotating axle skewer 2 is plugged into the right quadrangle hollow 13 of, the rotating axle skewer sleeve 12, and then the mounting portion 22 is placed on the against member 11. The rotating axle skewer 2 as well as the food will rotate with the rotation of the motor 14.

Because the rotating axle skewer sleeve 12 in the present invention is provided with a regular octagonal hollow 13, the spear end 21 of the rotating axle skewer 2 can be promptly and smoothly plugged into the sleeve 12 in any azimuth angle so as to save time for installation.

While the preferred embodiments of the invention have been described above, it will be recognized and understood that various modifications may be made therein and the appended claims are intended to cover all such modifications which may fall within the spirit and scope of the invention.

What is claimed is:

1. A rotating axle skewer sleeve of a rotisserie oven comprising:

a rotating axle skewer sleeve being provided on one inner side wall of a rotisserie oven, said rotating axle skewer sleeve being provided with a regular octagonal hollow in the center, and the rear end of said rotating axle skewer sleeve receiving a protruding rod of a motor provided on the other inner side wall of a rotisserie oven, and said regular octagonal hollow being provided for a spear end of a rotating axle skewer to be promptly and smoothly plugged into in any azimuth angle so as to save time for installation.

* * * * *